APPARATUS FOR PRINTING AND NOTCHING

Original Filed Jan. 19, 1940 2 Sheets-Sheet 1

Inventor
Roger Connor

By Oscar A. Mellin
Attorney

APPARATUS FOR PRINTING AND NOTCHING

Original Filed Jan. 19, 1940 2 Sheets-Sheet 2

INVENTOR.
ROGER CONNOR
BY
Oscar A. Mellin
ATTORNEY

Reissued Aug. 17, 1948

Re. 23,026

UNITED STATES PATENT OFFICE 23,026

APPARATUS FOR PRINTING AND NOTCHING

Roger Connor, Athens, Ohio, assignor to The McBee Company, Athens, Ohio, a corporation of Ohio Original No. 2,293,713, dated August 25, 1942, Serial No. 314,676, January 19, 1940. Application for reissue April 10, 1944, Serial No. 530,381

8 Claims. (Cl. 101—19)

My invention relates to the preparation of cards which are to be sorted in the manner described in United States Letters Patent No. 1,544,-172 to A. Perkins, to which reference may be had for a complete detailed description. I shall therefore only describe such parts thereof as relate to my invention. As described in that patent, the cards are provided with series of perforations punched adjacent one or more edges of the card as may be desired. These perforations are then slotted or notched to the edge of the card to form a pattern relating to a single classification as fully described in said patent. These cards are then generally prepared for use by writing certain desired information thereon. The information appearing on other documents or records, for example, the copies of the sales invoices of a firm, may and usually do contain many lines of billing on each invoice. That is to say, several different products may be invoiced or charged on one invoice blank, and in the analysis of sales according to the products, it is necessary to prepare individual analysis cards for each product sold or invoiced on each invoice.

The usual practice is for a clerk to copy from an invoice all data on the Perkins cards pertaining to one product appearing on the invoice and to identify that card with the particular customer sold and the name or identification of the saleman who makes the sale. This data usually includes the quantity sold, the number or name of the products and the sales value of that particular item. The clerk may record at the same time on the card the number or name of the customer, the number or name of the salesman and the geographical location of the customer. A similar card would be prepared in like manner for each item sold of the invoice and, in the same manner, cards would be prepared for items of all of the invoices. In other words, if there were five hundred invoices for a particular days billing, containing an average of five separate items per invoice, 2500 Perkins cards would be prepared or transcribed in the manner described above.

Because of the element of error in transcribing the information from the invoice copies to the cards incorrectly, duplicate cards being prepared in error or lines of billing missed entirely (cards not being prepared) it is necessary for some one to check the accuracy of the transcription or preparations of the cards. This is usually done by adding the quantities sold, or the amount sold or both as they appear on the faces of the cards and comparing the totals with the totals of the invoice copies. This "proving" is an entirely separate operation.

After the cards have been prepared by transcription they are handed to the punching or slotting operator who identifies each card with its sorting classification, by slotting or notching a predetermined pattern in the edges of the cards according to the codes for the style, number or name of the product sold, the number or name of the customer, the number or name of the salesman and the customer's geographical location. This slotting is, of course, a third operation necessary in preparing the cards for the analysis work. The cards are then ready to be sorted into groups according to customers, products, salesmen, etc., or any other analysis required for the proper conduct of the business.

My invention has for its principal object to provide a method of mechanically writing the analysis or accounting data on the face of the cards instead of manually, then to provide for automatically accumulating the quantities sold and/or the sales values from each card at the time the cards are mechanically written so that these totals will be available immediately after the card writing operation for proving or reconciling with the totals of the sales invoices from which the cards were prepared.

My invention has for its further object to provide for slotting or notching the cards for their sorting classifications at the time the cards are written.

It is apparent that the notching or slotting of the Perkins cards is a very technical operation and the utmost care must be taken in order to eliminate errors because obviously if a card is erroneously slotted, it is hopelessly lost in the files. Because of that fact, it has been necessary to provide apparatus which can be used to mechanically or electrically operate punching devices actuated from a keyboard so as to reduce the chances of error to the minimum. Devices of this kind are shown in United States Letters Patent to N. S. Welk, No. 2,035,777; to D. A. Nevin, No. 2,041,085, and to Welk and Nevin, No. 2,062,153.

To accomplish the objects of my invention, I combine parts of an adding machine, parts of the necessary elements of the slotting machine and provide means to cause the operation of slotting a predetermined pattern of notches to simultaneously print data corresponding to the pattern of notches and to compute accounting data on the face of the card.

For the purpose of illustrating apparatus which may be employed to carry out the steps of my invention, I have prepared diagrammatic sketches of apparatus for this purpose which is shown in the drawing which accompanies this application and which is a part of this specification, and wherein.

Similar reference numerals refer to similar parts throughout the entire specification.

Figure 1:
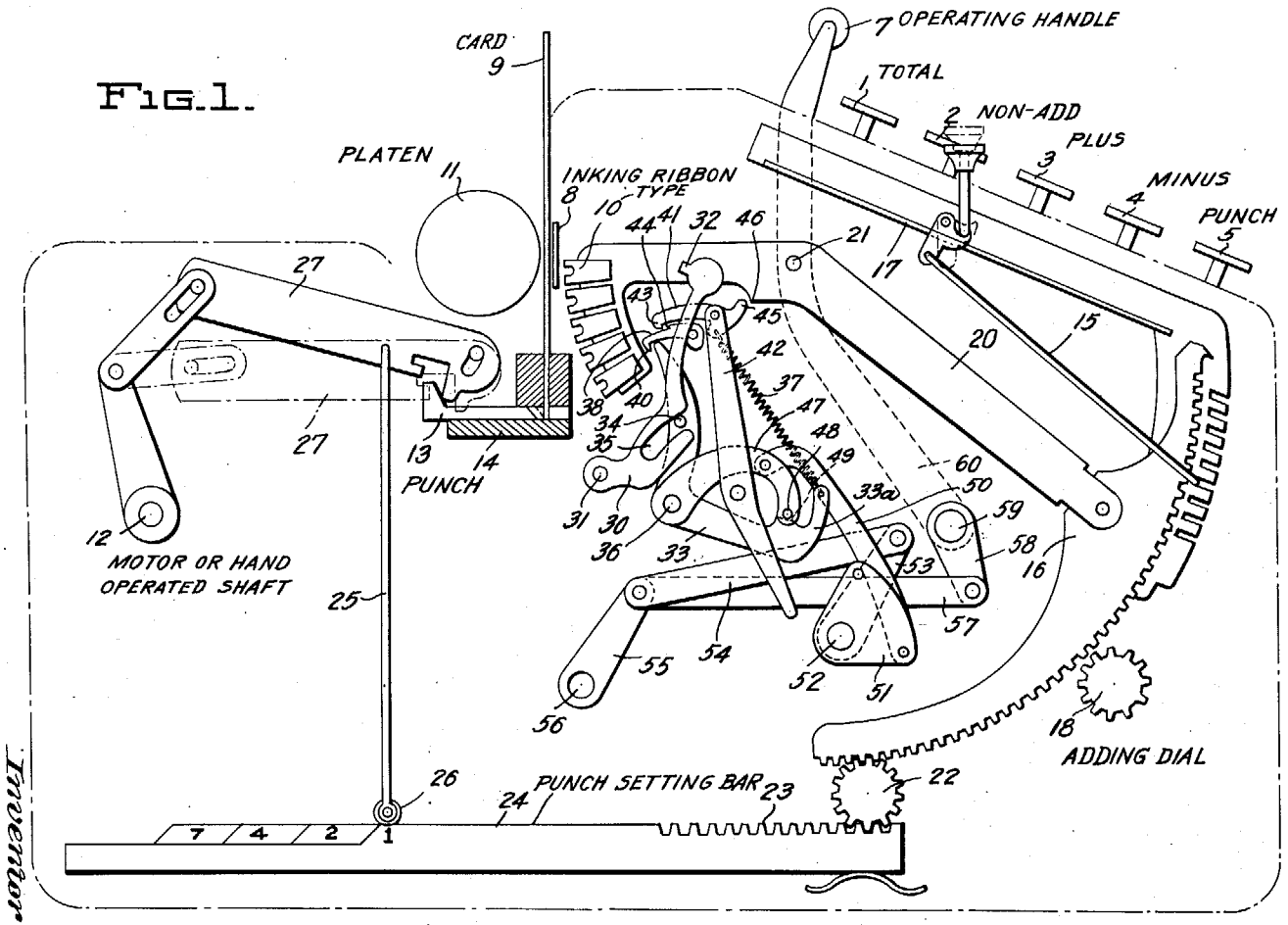
Figure 1 is a diagrammatic view of a concrete form of apparatus for carrying out the steps of my improved method.
Figure 2:
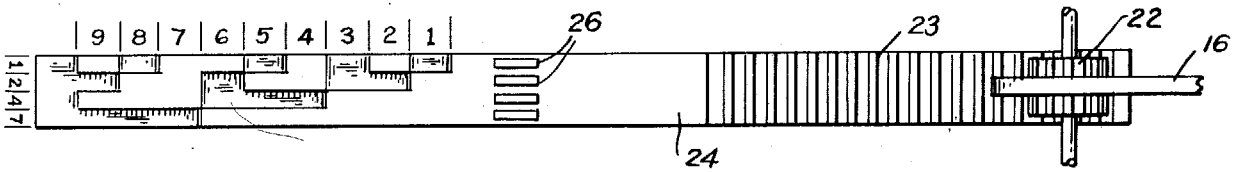
Figure 2 is a top plan view of the punch selector mechanism.
Figure 3:
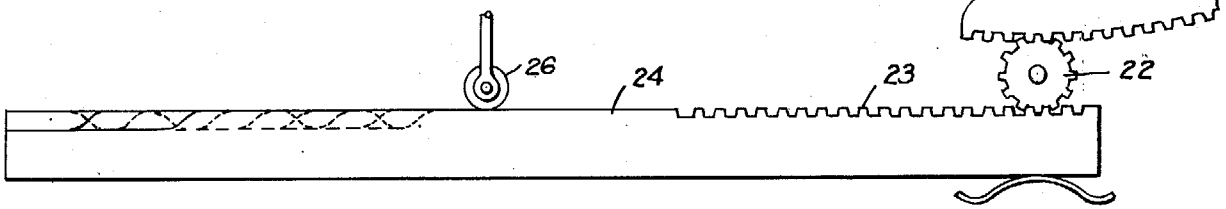
Figure 3 is a side elevation of the mechanism illustrated in Figure 2.

As shown in the drawing which, as stated, is necessarily more or less diagrammatic, and is supplied solely for illustrating an apparatus to employ my method, but it should be clear many different constructions may be used for that purpose. I provide a keyboard, only one of the keys being shown, as the construction and operation of these keys is well understood. This keyboard is equipped with the required number of keys suitably connected to actuate the mechanism for printing and adding or subtracting the data to be printed on the card. At one side of the keyboard are a number of keys 1, 2, 3, 4 and 5. These keys are preferably marked "Total," "Non-add," "Plus," "Minus," and "Punch," while the keys indicated by reference numeral 6 are the numerical keys, only one being shown. The depression of the non-add key 2 will enable the operator to print on the face of the card, the customer's account number, the date as 12/16/40, the salesman's number, or the number of the section or department. Then by depressing the required keys and actuating the handle 7 (or if the machine is electrically driven the motor bar), this trips the trigger mechanism (not shown) controlling the type 10 which prints the desired data on the card 9 by means of the inking ribbon 8, a platen or rubber printing roll 11 is provided opposite the type and ribbon. This same movement of the operating handle 7 turns the motor, or hand operated, shaft 12, which in turn actuates the punch 13 causing it to move through the die 14 and slot or notch the card 9 on its lower edge.

By releasing the non-add key 2 the operator can then print on the card, for example, the kilowatt hours, the price, etc. At the same time, the actuation of the keyboard will select the corresponding punches so that actuation of the motor bar or handle 7 will both print and slot simultaneously.

The depressing, for example, of the key 5 causes the index bar 15 to be drawn into such position that it stops the adding rack 16 at the fifth notch. As is well understood by persons skilled in the art, this causes the locking strip 17 to slide up so as to prevent any other key being depressed in the same column. With the first movement of the handle 7, as it is pulled forward, the adding wheel or dial 18 is drawn away from the adding rack 16. As the motion of the handle continues, the adding rack 16 descends until stopped by index bar 15. During this operation the rear end 19 of the sector 20 which is mounted upon a pivot 21 is moved upward as the adding rack 16 descends until the numeral 5 on the type 10 is in printing position opposite the platen or rubber printing roll 11. As is well understood, to the right of the type 10 is mounted the so-called firing mechanism, which is described herewith, although its construction is very familiar to people in the industry. The firing mechanism for actuating the type in response to movement of the handle includes a hammer 30 mounted upon a pivot pin 31 and having an upper head 32 adapted to strike the selected type 10. The hammer 30 is actuated toward and from the type by means of a bell crank 33 whose intermediate pin or roller 34 is movable within a slot 35 in the hammer. This bell crank is mounted on a pivot pin 36, and is urged in a counterclockwise direction by a spring 37 attached to its lower arm 33a and suitably secured to the machine frame.

Actuation of the bell crank 33 by the spring 37 is preventable by a latch 38 mounted on a pivot pin 39 and having a depending nose 40 adapted to engage the end of the upper bell crank arm 33b to prevent counterclockwise movement of the bell crank 33 about its pivot pin 36. This latch 38 is swingable upwardly to remove its depending nose 40 from the lever arm 33b by an operating lever 41 pivotally mounted upon a control lever 42 and having a hooked end 43 adapted to engage a shoulder 44 on the latch 38 and effect its elevation. Under some operating conditions an upstanding projection 45 on the operating lever is capable of engaging a cam 46 on the sector 20 to swing the hooked end 43 upwardly and prevent its engagement with the shoulder 44, as will be explained hereinafter.

Movement of the bell crank 33 in a clockwise direction against the action of the spring 37 is effected by an arm 47 mounted on the pivot pin 36 and having a pin 48 engageable with an intermediate shoulder 49 on the bell crank 33. The arm 47 is swingable about its pivot 36 by a link 50, whose upper end is pinned to the arm 47 and whose lower end is pinned to a drive sector 51 mounted on and secured to a shaft 52. A lever arm 53 is also secured to the shaft 52 and is connected to a link 54 whose other end is pinned to a lever 55 mounted on a shaft 56 suitably supported in the machine frame. Another link 57 is pinned to this last-mentioned lever 55 and to an arm 58 secured to a shaft 59 to which the lever 60 of the operating handle 70 is also attached.

With the parts in the positions illustrated in the drawing, the spring 37 is prevented from producing actuation of the hammer 30 by engagement of the pin 48 on the end of the arm 47 with the shoulder 49, such actuation also being prevented by the latch 38. Movement of the operating handle 7 effects turning of the sector 51 in a counterclockwise direction, through the agency of the levers and links 53—60, pushing the link 50 upwardly and elevating the pin 48 on the arm 47 from the shoulder 49. Such counterclockwise movement also engages a pin 61 on the sector 51 with the depending arm 42a of the control lever 42, which swings the latter in a clockwise direction and engages the hooked end 43 of the operating lever 41, with the latch shoulder 44, elevating the latch 38 from engagement with the bell crank 33, which then permits the spring 37 to swing the bell crank 33 in a counterclockwise direction and move its pin 34 within the hammer slot 35 to effect movement of the hammer and strike its head 32 against the type 10, to print a numeral upon the paper 9. Release of the operating handle 7 effects clockwise movement of the sector 51, which moves the arm 47 downwardly and swings the bell crank 33 in a clockwise direction, to return the hammer 30 and its head 32 to initial position.

In the event that the machine is to notch but not print, the cam 46 on the sector 20 will be in a lowermost position, so that clockwise swinging of the operating lever 42 upon contact of the pin 61 therewith will force the nose 45 against the cam and swing the hooked end 43 of the control lever 41 out of shoulder engaging position, which will result in the latch detent 41 remaining in position to hold the bell crank 33 against the action of the spring 37 and prevent movement of the hammer 30.

In connection with the specific example of printing referred to above, further movement of the handle pulls the trigger, the hammer falls, printing numeral 5 upon the paper. As this takes place, the movement of the adding rack 16 will actuate a pinion 22, the teeth of which are in mesh with a rack 23 on one of the punch setting bars 24. These bars are cut away to actuate punches to slot with the numerals 1, 2, 4, 7. A connecting rod 25 suitably equipped with a roller 26 which rides on the edge of each of the punch setting bars 24, is connected to the punch actuating arm 27 so that when the desired punches are set, the actuation of the motor, or hand operated, shaft through the medium of the operating handle 7 or motor bar (not shown) which is described fully in one of the patents herein named, will notch or slot the desired pattern in the edge of the card, at the same time that the desired data is being printed on the face of the card. From this description it will be clear that I index the key punching guides from the adding machine keyboard in the same manner in which the adding and printing sectors of an adding machine are indexed from this same keyboard. A set of figures set up on the keyboard for slotting will cause the slotting dies to be actuated when a separate key 5 marked "Punch" is actuated. This key and its function is very much the same in its function and operation as the non-add, print, or any other special or result keys now standard equipment in adding machines.

The operation of my method is as follows: a card is inserted into the machine in much the same manner it is placed in a machine of one of the Welk or Nevin patents, or the manner in which it would be placed in the front feed of an adding machine. The operator then sets up the amount or quantity on the keyboard and depresses the non-add key or motor bar so set up to print on the card the desired data but not to punch or slot it. Obviously, this printing only places upon the face of the card, the number of the customer, the number of the salesman, or the name of the product, or all three at one writing. A second set of figures is now set up on the keyboard to give the quantity and amount or sales value of the sale. Following this the operator will depress the clutch or add motor bar thus causing the machine to print the amount on the face of the card and add that in the adding register or dials 18 of the machine. This action of the operator depressing the handle or motor bar will, if the operator depresses the punch key, cause the slotting dies or punches 13 to operate and form the predetermined pattern on the edge of the card.

It will be apparent from the foregoing description that in this manner the card is mechanically prepared and the errors owing to the human equation will be reduced to a minimum. It will also be clear to persons skilled in the art that by following my method, it is possible for one operator to slot the cards for their proper classification and prove the accuracy of the work at the same time that the cards are being written, because the totals of all of the computations can be determined for checking or proving purposes as described. This will greatly expedite the work in connection with the use of cards of the Perkins type and make it possible for analysis figures to be more quickly and more accurately produced.

Having thus described my invention, what I claim and desire to secure by Letters Patent is:

1. In a machiine of the character described, a differentially movable toothed segment, means to determine the extent of movement of said segment, type selected by said segment for printing, a platen cooperable with the selected type, a stationary card guide and die for locating a card in printing position, punches adjacent said guide for notching an edge of the card, means for operating said punches individually or in selected combinations, a toothed element differentially positionable in accordance with the position of said differentially movable toothed segment, a pinion intermediate the toothed segment and said element in mesh with the teeth of both, and means controlled by said element for controlling the operative connection between said punches and said punch operating means.

2. In a machine of the character described, a differentially movable toothed segment, means to determine the extent of movement of said segment, type selected by said segment for printing, a platen cooperable with the selected type, a stationary card guide and die for locating a card in printing position, punches adjacent said guide for notching an edge of the card, means for operating said punches individually or in selected combinations, a toothed element differentially positionable in accordance with the position of said differentially movable toothed segment one end of which has a plurality of relatively displaced cam surfaces, a pinion intermediate the toothed segment and said element in mesh with the teeth of both, a connecting rod, a roller carried thereby which rides on said cam surfaces, and a connection between said punch operating means and said punches controlled by said connecting rod.

3. In a machine of the character described, a differentially movable member, means to determine the extent of movement of said member, type selected by said member for printing, a platen cooperable with the selected type, a stationary card guide and die for locating a card in printing position, punches adjacent said guide for notching an edge of the card, means for operating said punches individually or in selected combinations, said means comprising an oscillatable member, a link for each punch pivotally connected to said member, a punch actuating arm slidably connected to said link, an element differentially positionable in accordance with the position of said differentially movable member, and means controlled by said element for controlling the operative connection between said punches and said punch operating means.

4. In a machine of the character described, a differentially movable toothed segment, means to determine the extent of movement of said segment, type selected by said segment for printing, a platen cooperable with the selected type, a stationary card guide and die for locating a card in printing position, punches adjacent said guide for notching an edge of the card, means for operating said punches individually or in selected combinations, a toothed element differentially positionable in accordance with the position of said differentially movable toothed segment, a pinion intermediate the toothed segment and said element in mesh with the teeth of both, means controlled by said element for controlling the operative connection between said punches and said punch operating means, the differentially movable segment, the toothed element, the type and the punches being operable in synchronism in a single continuous cycle of operation.

5. In a machine of the character described, a differentially movable member, means to determine the extent of movement of said member, type selected by said member for printing, a platen cooperable with the selected type, a stationary card guide and die for locating a card in printing position, punches adjacent said guide for notching an edge of the card, means for operating said punches individually or in selected combinations, said means comprising an oscillatable member, a link for each punch pivotally connected to said member, a punch actuating arm slidably connected to said link, an element differentially positionable in accordance with the position of said differentially movable member, means controlled by said element for controlling the operative connection between said punches and said punch operating means, the differentially movable member, the type and the punch operating means being operable in synchronism in a single continuous cycle of operation.

6. In a machine of the character described, a differentially movable member, key means to determine the extent of movement of said member, type positioned by said member for printing and selected by the extent of the movement of said member, a platen cooperable with the selected type, a stationary card guide and die for locating a card in printing position, punches adjacent said guide for notching an edge of the card, punch selecting means operatively connected to the differentially movable member for selecting said punches for operation in accordance with the extent of movement of said differentially movable member, means for operating selected punches, the differentially movable member to select the type, the type, the punch selecting means and the punches being operable to print and punch in a single continuous cycle of operation.

7. In a machine of the character described, a differentially movable member, key means to determine the extent of movement of said member, type selected by said member for printing, the selection of the type being determined by the extent of movement of said member, a platen cooperable with the selected type, a stationary card guide and die for locating the card in printing position, punches adjacent said guide for notching an edge of the card, means for operating said punches, a normally ineffective connection between each punch and the punch operating means, a punch selecting element operatively connected to said differentially movable member to select punches determined by the extent of movement of the differentially movable member by rendering the connection between the selected punches and the punch operating means effective, the differentially movable member to select the type, the type, the punch selecting means and the punches being operable to print and punch in a single continuous cycle of operation.

8. In a machine of the character described, a differentially movable toothed segment, key means to determine the exent of movement of said segment, type selected by said segment for printing, the selection of said type being determined by the extent of movement of the segment, a platen cooperable with the selected type, a stationary card guide and die for locating a card in printing position, punches adjacent said guide for notching an edge of the card, punch operating means for said punches, a normally ineffective connection between each punch and the punch operating means, a punch selecting element operatively connected to said segment and actuated thereby in accordance with the extent of the movement thereof to select punches for operation by rendering the connection between the selected punch or punches and punch operating means effective, and operating means for operating the segment to select the type and punches and cause the same to print and punch in a single continuous cycle of operation.

ROGER CONNOR.

REFERENCES CITED

The following references are of record in the file of this patent:

UNITED STATES PATENTS

| Number | Name | Date |
|---|---|---|
| 1,253,417 | Pierce | Jan. 15, 1918 |
| 1,260,704 | Pierce | Mar. 26, 1918 |
| 1,657,712 | Goldberg | Jan. 31, 1928 |
| 1,739,087 | Perkins | Dec. 10, 1929 |
| 2,035,777 | Welk | Mar. 31, 1936 |
| 2,041,085 | Nevin | May 19, 1936 |

FOREIGN PATENTS

| Number | Country | Date |
|---|---|---|
| 346,482 | Italy | Feb. 10, 1937 |